United States Patent
Maier et al.

(10) Patent No.: US 9,274,516 B2
(45) Date of Patent: Mar. 1, 2016

(54) COLLISION DETECTION METHOD FOR A DRIVE UNIT

(75) Inventors: Michael Maier, Bischbrunn (DE); Matthias Wahler, Muedesheim (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 13/226,441

(22) Filed: Sep. 6, 2011

(65) Prior Publication Data
US 2012/0084020 A1 Apr. 5, 2012

(30) Foreign Application Priority Data
Sep. 7, 2010 (DE) .......................... 10 2010 044 644

(51) Int. Cl.
*G05B 19/406* (2006.01)
*G05B 19/4062* (2006.01)

(52) U.S. Cl.
CPC .......... *G05B 19/4062* (2013.01); *G05B 19/406* (2013.01); *G05B 2219/37624* (2013.01); *G05B 2219/40317* (2013.01)

(58) Field of Classification Search
CPC ............. G05B 19/406; G05B 19/4062; G05B 19/37624; G05B 19/40317
USPC .............. 702/41, 96, 142, 145; 318/255, 280, 318/650, 823, 824
See application file for complete search history.

(56) References Cited

U.S. PATENT DOCUMENTS

| | | | | |
|---|---|---|---|---|
| 5,142,210 A | * | 8/1992 | Kojima et al. | 318/566 |
| 6,355,813 B1 | * | 3/2002 | Clark et al. | 549/432 |
| 6,356,813 B1 | * | 3/2002 | Sommer et al. | 701/1 |
| 6,490,856 B2 | * | 12/2002 | Bidner et al. | 60/274 |
| 7,093,587 B2 | * | 8/2006 | Glora et al. | 123/492 |
| 7,102,311 B2 | * | 9/2006 | Nishimura et al. | 318/280 |
| 7,102,315 B2 | * | 9/2006 | Nakata et al. | 318/568.22 |
| 7,627,440 B2 | * | 12/2009 | Rehm et al. | 702/41 |
| 2005/0046376 A1 | * | 3/2005 | Hooge et al. | 318/650 |
| 2006/0071625 A1 | * | 4/2006 | Nakata et al. | 318/568.12 |
| 2007/0052383 A1 | * | 3/2007 | Abe et al. | 318/651 |
| 2008/0065290 A1 | * | 3/2008 | Breed et al. | 701/29 |
| 2009/0295324 A1 | * | 12/2009 | Shim et al. | 318/632 |

FOREIGN PATENT DOCUMENTS

DE 102 45 594 4/2004

OTHER PUBLICATIONS

Tsai et al, "Design of a torque observer for detecting abnormal load" Control Engineering Practice 8 (2000) 259-269.*

* cited by examiner

*Primary Examiner* — Alexander Satanovsky
*Assistant Examiner* — John Kuan
(74) *Attorney, Agent, or Firm* — Maginot, Moore & Beck LLP

(57) ABSTRACT

A collision detection method for a drive unit including an electric drive motor and a movable component which is driven thereby, wherein an actual torque and an actual acceleration of the electric drive motor are sensed and a collision of the movable component is detected on the basis of an evaluation of a predefinable mathematical combination of the actual torque and the actual acceleration.

5 Claims, 2 Drawing Sheets

COLLISION DETECTION METHOD FOR A DRIVE UNIT

This application claims priority under 35 U.S.C. §119 to German patent application no. DE 10 2010 044 644.0, filed Sep. 7, 2010 in Germany, the disclosure of which is incorporated herein by reference in its entirety.

BACKGROUND

The present disclosure relates to a collision detection method for a drive unit comprising an electric drive motor and a movable component which is driven thereby.

Drive systems of this type are widespread, in particular, in automation technology and are used in a variety of ways, for example in robots, processing machinery or transportation machinery etc. When they are used in these fields it is possible for collisions to occur between the movable component and fixed or movable obstacles, for example goods for transportation or processing, walls, housings, other machine components or even persons etc., are not excluded. In order to avoid injury to persons and damage to machines it is necessary to detect collision in order, for example, to initiate suitable reactions.

DE 102 45 594 A1 discloses a collision detection method in which drive-side and output-side variables are sensed and compared in order to detect a collision. However, such a solution requires a complex sensor system at least on the output side.

It is desirable to specify possible ways of detecting a collision which are easy to implement but nevertheless operate safely and reliably.

SUMMARY

According to the disclosure, a collision detection method for a drive unit comprising an electric drive motor and a movable component which is driven thereby having the features of Patent claim 1 is proposed. Advantageous refinements are the subject matter of the dependent claims and of the following description.

The disclosure is based on the realization that the drive-side variables of the torque (in the case of rotational drive motors) or the driving force (in the case of translational driving motors) and the acceleration are suitable, when mathematically combined, in particular multiplied, for the simple, but nevertheless safe and reliable detection of collisions. Using these variables is particularly advantageous since they can in any case be output by modern drive control units. An additional sensor system is not necessary and it is possible, in particular, to dispense with an output-side sensor system. Features of the disclosure have overcome the difficulty of finding suitable movement variables and an associated suitable mathematical combination which permits reliable detection of collisions. In particular, it has specifically been found in practice that detecting collisions during operation of the drive motor at the torque limit or force limit proves difficult since in all the previously tried drive variables it has then been found impossible to make a differentiation between a collision and a normal acceleration phase or braking phase.

The mathematical combination can be permanently predefined or else can also be set by the user. This permits optimum adaptation to particular conditions. It has proven particularly expedient to use the product of the torque or driving force and acceleration for the purpose of evaluation, for example by comparison of threshold values. However, other evaluation methods have also been considered, wherein, for example, timing behavior is evaluated, integration or differentiation takes place and the like.

The result of the mathematical combination is preferably compared with a threshold value which is determined during the sensing of the torque or driving force and acceleration, i.e. in which case "online", by using a maximum torque or driving force, sensed within a first time period, and a maximum acceleration, sensed within a second time period, of the electric drive motor, wherein the first and second time periods are, in particular, identical and, in particular, can cover the entire operating period. A time period which moves along is also advantageous. The threshold value can therefore be adapted continuously to the current conditions, for example to changed bearing friction, changed loads etc. A weighting factor is expediently included in the threshold value in order to provide a sufficient distance between the sensed maximum values and the threshold value. It has been found that the product of the torque or driving force and acceleration during a collision becomes negative, with the result that the weighting factor in this case is expediently also negative.

In a particularly preferred embodiment of the disclosure, the product of the torque or driving force and the acceleration is monitored. In a normal operating mode the product in fact exhibits a positive profile, and in the event of a collision it exhibits a negative value which is high in absolute value, with the result that it is particularly easy to detect a collision here. It has become apparent that the product of the torque or driving force and the acceleration assumes negative values in particular cases, for example when there is a large amount of play between the drive motor and the component, even in the normal operating mode. In these cases, a suitable predefined value for the weighting factor is used for the purpose of delineation.

According to the disclosure, a suitable collision detection method can be provided which can be applied extremely widely and can subsequently also be easily implemented in existing drive devices.

A computing unit according to the disclosure, for example a control unit of a drive system, is configured, in particular in terms of program technology, to carry out a method according to the disclosure.

The implementation of features of the disclosure in the form of software is also advantageous since this permits particularly low costs, in particular if an executing computing unit is also used for other tasks and is therefore present in any case. Suitable data carriers for making available the computer program are, in particular, diskettes, hard disks, flash memories, EEPROMs, CD-ROMs, DVDs etc. It is possible to download a program via computer networks (Internet, Intranet etc.).

Further advantages and refinements of the disclosure can be found in the description and in the appended drawings.

Of course, the features which are mentioned above and which are still to be explained below can be used not only in the respectively specified combination but also in other combinations or alone, without departing from the scope of the present disclosure.

Features of the disclosure are illustrated schematically in the drawing on the basis of an exemplary embodiment and will be described in detail below with reference to the drawing.

DETAILED DESCRIPTION

Figure 1:
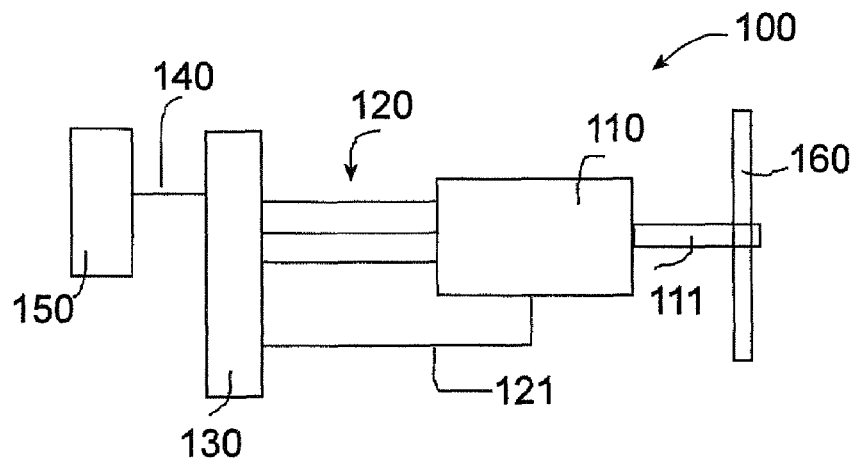
FIG. 1 is a schematic view of a drive unit which can be monitored according to the disclosure.

FIG. 1 is a schematic illustration of a side view of a drive unit 100 which can be monitored according to the disclosure. The drive unit 100 has an electric drive motor 110 which is connected to a power component 130 via a usually three-phase power connection 120. In addition to the power connection 120, one or more data connections 121, for example for the rotational speed, temperature, position etc., are expediently also provided. The power component 130 is in turn connected to a control component 150, via a connection 140, usually a field bus connection, which control component 150 serves to actuate and monitor the drive unit. A movable component 160 is driven by the electric drive motor, which movable component 160 is implemented in the simple embodiment illustrated here as a wheel 160 which is attached to the shaft 111 of the drive motor 110.

A detection of a collision within the scope of the disclosure will now be explained in more detail below with reference to FIGS. 1 to 4. In the event of a collision which is to be detected, the wheel 160 or a component which is connected thereto, such as for example a processing mechanism or conveying mechanism, impacts against an obstacle, as the result of which the movement of said component is inhibited. This inhibiting effect on the drive motor 110 can be particularly easily detected in a particularly preferred embodiment by monitoring the selected drive parameters of the torque M and acceleration a.

Even though FIG. 1 shows a rotational drive motor in which the torque and acceleration are monitored according to the disclosure, features of the disclosure can, of course, also be applied with translational motors in which the driving force and the acceleration are then monitored.

Figure 2:
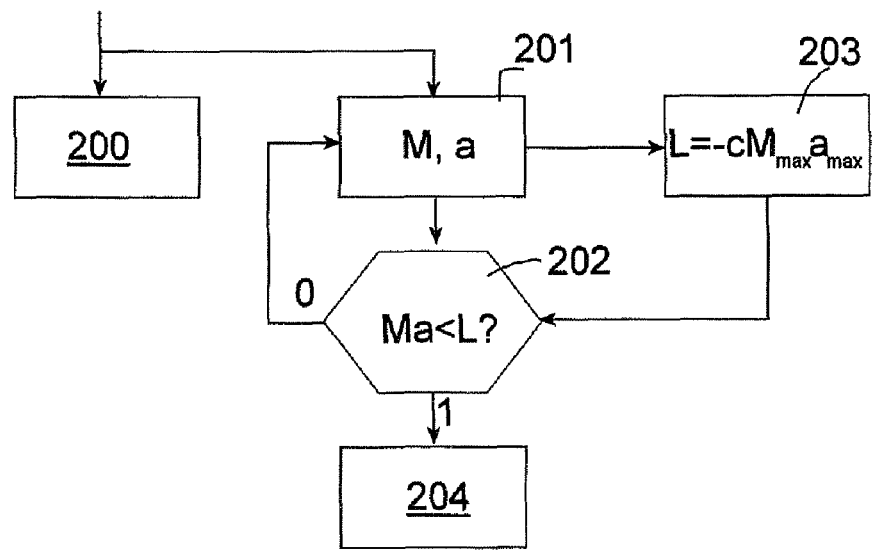
FIG. 2 shows a preferred embodiment of a collision detection method according to the disclosure by means of a flowchart.

FIG. 2 is a schematic illustration of a preferred embodiment of the collision detection method according to the disclosure by means of a flowchart. The method occurs in parallel with an operation 200 of the drive unit. During the detection of the collision, the torque M and the acceleration a of the drive motor 110 are monitored for this purpose in a step 201, wherein the detection of the collision preferably takes place in the control component 150 which is assigned to the drive motor 110.

During the monitoring process, the product M·a of the torque and the acceleration is compared with a threshold value L in a step 202. If the product is greater than the threshold value (which is negative), no collision is detected and the method returns to the sensing step 201. If, on the other hand, it is detected that the product M·a is smaller than the threshold value L (i.e. more negative), the system continues in a step 204.

In the step 204, measures which protect the drive unit are initiated and/or operating states are stored for later analysis. Operating states such as the operating period (for example operating hours of the motor, power component and control component), position, speed and torque or force of the motor at the time of the collision and the like, are expediently stored, preferably in a memory of the control component. The stored data can be used later for the evaluation.

The threshold value L can, for example, be predefined during the activation of the drive unit or, as is illustrated in the figure by an optional step 203, can also be determined during operation. For this purpose, the maximum torque $M_{max}$ which is sensed over a first time period is multiplied by the maximum acceleration $a_{max}$ which is sensed over a second time period and a negative weighting factor-c wherein the first and second time periods are expediently the same and move along, for example, with the sensing time. The maximum values of the last 30, 60, 90, 120 or the like seconds are therefore expediently used for the purpose of determining threshold values.

Figure 3:
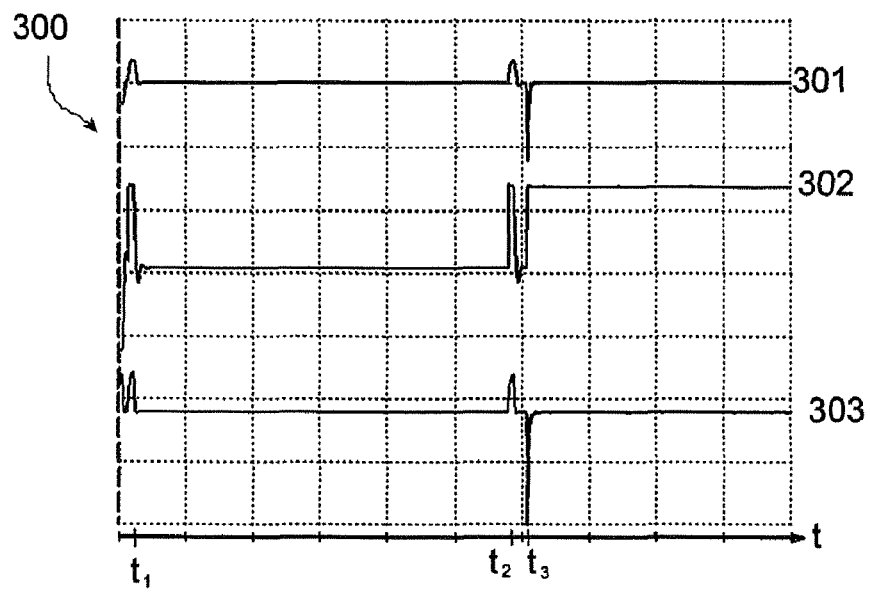
FIG. 3 shows sensing signals and evaluation signals of a drive unit in the case of acceleration in different situations.

In FIG. 3, in a diagram 300, a sensed acceleration a is plotted on graph 301, a sensed torque M is plotted on a graph 302, and the product a·M which is formed from the acceleration a and torque M is plotted on a graph 303, all against time t on the abscissa. During the sensing, the drive unit was accelerated at times $t_1$ and $t_2$, and a collision with a fixed obstacle took place at a time $t_3$. It is clearly apparent that the signal 303 which is to be evaluated behaves significantly differently in the event of a collision than in the event of acceleration. In particular, in the event of acceleration relatively small deflections in the upward direction occur, whereas in the event of a collision a large deflection in the downward direction occurs. In this way, a collision can be particularly easily detected with the solution according to the disclosure. The long-term average serves as a zero line in relation to which the maximum values and the threshold value are determined.

Figure 4:
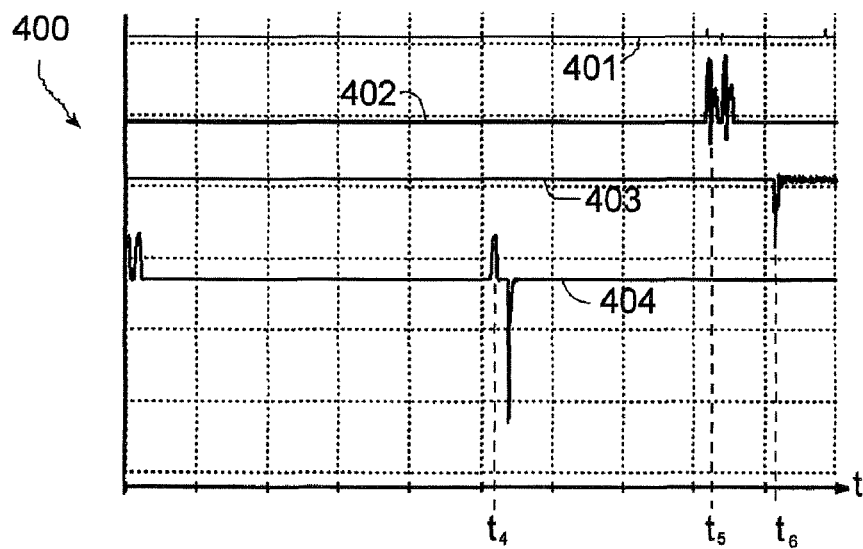
FIG. 4 shows two evaluation signals for different drive units and situations.

In FIG. 4, different evaluation signals M·a are plotted against the time t on the abscissa in a diagram 400. The graph 401 shows the evaluation signal during operation of a drive unit at a constant speed, wherein there is a marked play between the drive motor and the driven component. The graph 402 shows the evaluation signal for the same drive unit, wherein an acceleration takes place. It is apparent that in this case significant deflections in the upward and downward directions occur in the evaluation signal after the play has been passed through, i.e. when the drive motor drives along the component (time $t_4$).

The graph 403 shows the evaluation signal for a drive unit which is operated in the central torque range, in the event of a collision (time $t_5$), and the graph 404 shows the evaluation signal for a drive unit which is operated at the torque limit, in the event of a collision (time $t_6$).

By comparing the graphs it becomes clear that a collision (graphs 403 and 404) can be particularly easily differentiated from an accelerated drive system with play (graph 402) through a suitable predefined value for the weighting factor.

What is claimed is:

1. A collision detection method for a drive unit including an electric drive motor and a movable component which is driven thereby, comprising:

using a drive control unit to actuate the electric drive motor to drive the movable component;

sensing drive parameters of the electric drive motor during actuation of the electric drive motor, the drive parameters including at least a torque and an acceleration for the electric drive motor;

determining a product of the torque and the acceleration using the drive control unit;

using the drive control unit to compare the product of the torque and the acceleration with a predefined threshold value and to determine whether a collision of the movable component has occurred based on the comparison, wherein, if a collision is detected, measures which protect the drive unit are taken and/or operating state variables are stored in a storage device.

2. The method according to claim 1, wherein the threshold value is determined during the sensing of the torque and the acceleration using a maximum torque value, sensed within a first time period, and a maximum acceleration value, sensed within a second time period, of the electric drive motor.

3. The method according to claim 2, wherein the threshold value comprises a product of a weighting factor of the maximum torque value, sensed within the first time period, and the maximum acceleration value, sensed within the second time period, of the electric drive motor.

4. The method according to claim 3, wherein the weighting factor is negative.

5. An apparatus comprising a computing unit configured to carry out a method according to claim 1.

* * * * *